OSCILLATOR CONTROL

Filed May 18, 1950

WITNESSES:
Robert C. Baird
Wm. L. Groome

INVENTORS
William S. Parnell &
John W. Taylor, Jr.
BY
F. E. Browder
ATTORNEY

Patented Jan. 10, 1956

2,730,619

OSCILLATOR CONTROL

William S. Parnell, Glen Burnie, and John W. Taylor, Jr., Baltimore, Md., assignors, by mesne assignments, to the United States of America as represented by the Secretary of the Navy Application May 18, 1950, Serial No. 162,738

1 Claim. (Cl. 250—36)

Figures 1, 2:
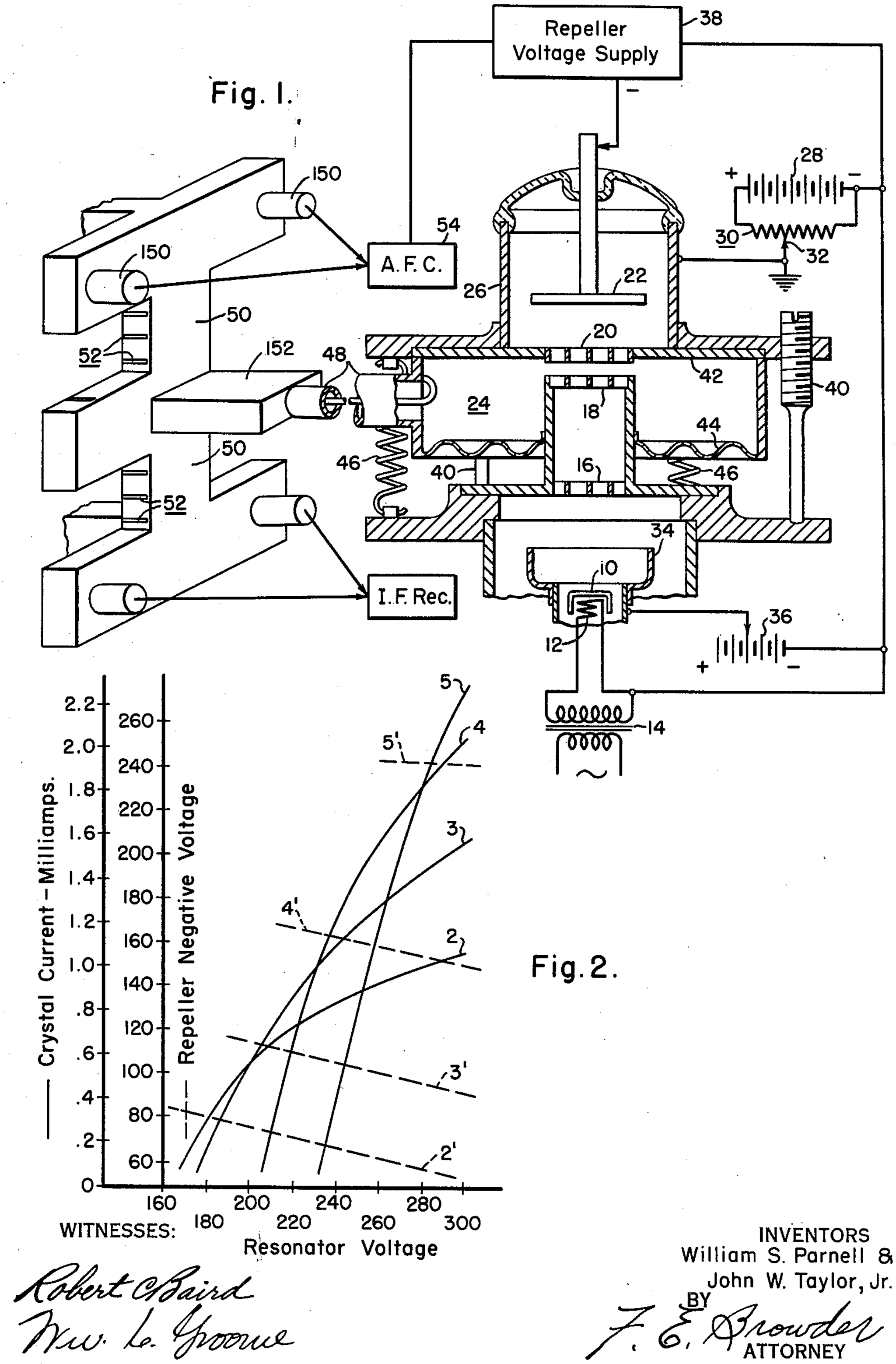

This invention pertains to electronic oscillators, and particularly to an arrangement for the control of the power output of an oscillator of the klystron type.

A principal object of the invention is to provide a circuit and arrangement for the control of the power output of a klystron oscillator which is used as the local oscillator of the receiving portion of a radar set of the heterodyne type. In such an application, it is of course necessary that the oscillation frequency be maintained closely at the desired value, and it has also been determined that, for optimum signal-to-noise ratio, the heterodyne mixer in microwave radar applications must be operated at a definite local oscillator power level. Heretofore, the power level at the crystal mixer has been adjusted by the use of a variable attenuator between the klystron local oscillator and the crystal, such attenuator for example taking the form of a flat piece or "card" of resistive material placed parallel to the axis of the wave guide coupling the local oscillator to the crystal mixer, so that movement of this card away from the center of the guide toward one of its inner boundary surfaces will alter the amount of attenuation produced.

The use of a variable attenuator of the type described is, however, attended by several serious disadvantages. First, accurate machining of the card, and particularly of its end sections, is necessary in order to provide good matching and a low standing wave ratio. Second, the mechanical construction is highly complicated because of the necessity of holding the card rigidly in place when motion is not desired, yet permitting free movement thereof when adjustments are to be made. Third, the method of inserting the card in the wave guide when the ends of the guide are not open is itself extremely complicated. For these and other reasons, it would be highly desirable to use a fixed attenuator to obtain the desired power level at the mixer, since this would avoid most of the mechanical complications involved in the use of variable attenuation. Even with a properly designed and installed fixed attenuator (the design of such elements being well known to those skilled in this art), it is necessary to provide a certain degree of adjustability of the power level supplied by the local oscillator to the crystal mixer, for example to compensate for the unavoidable variations between oscillator tubes. While it might appear that such residual adjustments might easily be made by adjusting the driving and control potentials of the klystron local oscillator itself, this procedure is rendered exceedingly complicated because of the fact that the operating frequency of the oscillator must be maintained rigorously constant, and the adjustment of its potentials invariably alters the oscillation frequency to an intolerable degree.

It is therefore an additional object of this invention to provide a klystron oscillator arrangement which can be used as the local oscillator, for example in a radar set, and in which the power output to the heterodyne mixer can readily be adjusted to its optimum value without disturbing the operating frequency, and in such degree as to permit the use of a fixed amount of attenuation between the oscillator and the crystal mixer of the set.

Still another object of the invention is to provide a klystron oscillator arrangement of relatively simple and economical construction in which the power output level can readily be adjusted by a purely electrical control, such as a potentiometer, to provide a desired range of power adjustment without the necessity for making a compensating adjustment of the output frequency.

A further object of the invention is to provide such an arangement which is rugged and relatively immune to shocks and vibration, and one in which the associated wave guide construction may be simple and compact.

An additional object of the invention is to provide a local oscillator arrangement in which the major portion of the required power attenuation is achievable by a fixed attenuator in the wave guide between the oscillator and the mixer, and a minor but essential portion is obtained by control of the shell or anode potential applied to the klystron tube itself. This division of the total power attenuation has the concomitant advantage that, where the same klystron tube supplies power both to the mixer and to an automatic frequency control circuit, the fixed attenuator in the wave guide may be so placed as to prevent coupling between these respective power supply channels.

The above and other objects and advantages of the invention will best be understood by referring to the following detailed specification of a preferred embodiment thereof, chosen by way of example, and to the accompanying drawing forming a part hereof, in which Fig. 1 is a view, principally in section, of a klystron oscillator tube and wave guide section, together with a schematic representation of a control circuit forming a part of the invention, and Fig. 2 is a graphical representation of certain of the electrical characteristics of one type of klystron tube, drawn to aid in the understanding of the operation of the invention.

The nature and construction of the klystron, or velocity-modulated cathode ray oscillator tube, is well known to those skilled in this art, but a brief description thereof will render the nature of the present invention more easily understandable. Such an oscillator, of the type known as a reflex klystron, is shown in section in Fig. 1 of the drawing, and comprises a cathode 10 which can be heated to incandescence as by a heater 12 and power supply transformer 14 so as to provide a source of electrons which are directed in a beam through grids 16, 18 and 20 toward a repeller electrode 22 whose potential is adjusted to turn the electrons back so that at least a portion thereof pass again through the resonator chamber 24 ultimately to be collected by the grids 18 and 20 or upon the walls of the chamber. Spent electrons which do not return to the cavity or chamber 24 are collected upon the shell 26, this shell constituting the anode of the device and being maintained at a high positive potential with respect to the cathode 10 as by a battery or other source of voltage 28. This shell or anode potential is rendered adjustable, in the present invention, by means of a potentiometer 30 connected in series with the source 28 and provided with an adjustable tap 32 connected to the shell.

The shield 34 surrounding the cathode is preferably maintained at a small positive potential with reference to the cathode to collect low velocity electrons and thus to aid in the formation of the beam passing through the resonator, a voltage source 36 being provided for this purpose. The repeller electrode 22 is supplied with the desired negative potential with reference to ground (shell) potential by a source of voltage indicated by block 38. As is usual in the construction of reflex klystrons, means are provided for adjusting the volume of chamber 24 and hence the resonant frequency of the tube, such means being shown in the drawing as a plurality of screws 40 which may be turned to vary the separation between the upper closure 42 of the resonator chamber and a corrugated or flexible lower closure 44 therefor, the desired adjustment being maintained by virtue of the springs 46 which act against the pressure of such screws.

Oscillatory energy is coupled from cavity or chamber 24 as by a conduit 48 or in any other convenient manner, and is delivered into a wave guide 50 in the present instance leading to the crystal mixer of a radar set. The frequency of the energy thus supplied is principally determined by the configuration of the resonator cavity, which is adjusted as by the screws 40 to lie at or near the desired value; ordinarily the precise adjustment of this frequency can be made by minor adjustments in the potential applied to the repeller electrode 22.

In order to provide the proper local power oscillator level at the crystal mixer, an attenuator is located within wave guide 50. As has been stated above, it has been proposed to provide some form of variable attenuator in this wave guide, to permit exact adjustment of the power level and to compensate for variations between different oscillator tubes, but the use of such a variable attenuator entails the several disadvantages which have been enumerated. The present invention therefore provides a fixed attenuator, which may be of the three card type indicated by numeral 52, in which the central card provides most of the actual attenuation, while the cards to either side thereof serve to provide the proper impedance matching characteristic for optimum standing wave ratio in the guide. The degree of attenuation is selected to give approximately the correct power level at the crystal mixer fed by the wave guide 50.

The klystron tube having been adjusted, as by screws 40, to produce the desired frequency of oscillations, the final adjustment of output power level is accomplished by adjusting tap 32 so as to vary the positive potential applied to the shell or anode 26. Such procedure would ordinarily also vary the output frequency, it being well known that changes in the anode voltage will alter the frequency of the oscillations produced. We have found, however, that the original and desired frequency of oscillations can be maintained by varying the repeller potential by only an amount which is well within the capabilities of an ordinary type of automatic frequency control circuit. This is of the essence of the present invention, because, while the desired frequency could of course be obtained by correcting the repeller potential after the initial adjustment of power output by means of the anode voltage control, if such a manual adjustment were required, the result would be a change in power output that would again have to be corrected, so that the final precise coordination of power output and frequency would be an exceedingly critical operation. However, since (as we have found) the corrective change in repeller voltage is of an order which can be obtained automatically by means of an automatic frequency control, the adjustment of anode or shell voltage to the proper power output setting will be followed automatically by the necessary shift in repeller potential to maintain the frequency constant at the desired value, and the operator will not even be aware of the fact that the change in repeller voltage is having its effect upon the extent to which he adjusts tap 32 in obtaining the proper power output to the mixer stage.

In order to achieve the above result, any conventional or desired automatic frequency control circuit, indicated in Fig. 1 by the block 54, is arranged to sample the energy delivered to the wave guide 50. This sampling is effected at the I. F. frequency of the system. The oscillations in wave guide 50 are mixed with oscillations derived from the transmitter tube (not shown) in crystal mixers 150. The output of these mixers at the I. F. frequency are impressed in the input of the AFC circuit. The system including the mixers 150 is separated electrically from the receiver mixer system by attenuator cards 52 in guide 50. This control circuit (which may be a known type of frequency discriminator of which the prior art affords many examples) is in turn arranged to control the voltage supplied to repeller electrode 22. The voltage supply 38 may thus comprise an amplifier arranged to provide a negative output potential dependent upon a grid bias supplied from the control circuit 54, the particular design of these elements themselves forming no part of the present invention.

The cards 52 on both sides of the input 152 to the guide 50 suppress coupling between the main energy channel to the mixer and the channel by which energy from the wave guide is applied to the automatic frequency control circuit 54. This decoupling feature is one of the reasons why the present invention contemplates the use of a fixed amount of attenuation of the wave guide in combination with a variable power output from the oscillator under the control of the variable shell or resonator voltage; that is, the fixed attenuation in the wave guide effectively isolates the automatic frequency control circuit 54 from that portion of the R. F. channel beyond the attenuator 52. Another advantage of the use of a certain fixed attenuation is that, while the entire control of oscillator output power could be obtained merely by adjusting the shell or resonator potential, obtaining a large amount of power reduction would involve operation on a relatively steep portion of the curve relating resonator voltage to power output. This may be seen by referring for instance to curve 2 of Fig. 2, which shows the variation in crystal current at the mixer with variations in resonator potential; the more reduction in resonator voltage which is required to provide the desired reduction in power output, the steeper becomes curve 2, which means that the adjustment of power output by this means alone becomes increasingly critical as the degree of power reduction is increased.

The curves of Fig. 2 are plotted for a condition of constant output frequency, the solid line curves numbered 2, 3, 4 and 5 showing the variation in crystal mixer current with changes in resonator or shell voltage, for respective sets of operating conditions. The dash line curves 2′, 3′, 4′ and 5′ show the variation in repeller negative voltage necessary to maintain the desired output frequency for each value of resonator voltage under the same operating conditions, and these latter curves make it clear that the change in repeller voltage required is relatively small, curve 2′ showing that the necessary change is only of the order of twenty volts for a change in resonator potential of the order of 140 volts and under the least favorable set of operating conditions of the klystron. Such a voltage variation is well within the capabilities of ordinary automatic frequency control circuits, and the recognition and application of this relationship forms an important aspect of the invention.

The invention has been described herein in connection with an exemplary and presently preferred embodiment thereof in compliance with the patent statutes, but it is to be understood that many changes in the details thereof may be made without departing from the scope of the invention as defined in the appended claim.

We claim as our invention:

In combination, a reflex velocity modulated oscillation generator having a cathode, a cavity resonator, a repeller electrode and means for adjusting the resonant frequency of said resonator, means for applying to said resonator a high positive potential with respect to said cathode, means for varying said positive potential to vary the power generated by said generator, means for applying to said repeller electrode a negative potential with respect to said cathode, a waveguide having a main energy channel and symmetrical cross channels at each end of the main channel and an input channel positioned intermediate the ends of the main channel, said input channel communicating with said generator for receiving electromagnetic oscillations produced therein. crystal mixers disposed in each of the cross channels, automatic frequency control means arranged to receive the combined energy output from the waveguide and the crystal mixers of one cross channel such that said negative potential may be varied to maintain the frequency of said generator at a desired constant value, a receiver mixer system coupled to the other of said cross channels and to said generator input channel, constant attenuation decoupling means electrically separating one cross channel from the other cross channel, said decoupling means being disposed within the main energy channel and on each side of the input channel to suppress coupling in the waveguide, each of said attenuation means comprising a plurality of cards of a resistance material spaced a substantial distance apart for absorbing part of the energy of the oscillations passing therethrough and to provide proper impedance matching characteristics for an optimum standing wave ratio in the waveguide.

References Cited in the file of this patent

UNITED STATES PATENTS

| | | |
|---|---|---|
| 2,462,294 | Thompson | Feb. 22, 1949 |
| 2,474,580 | Hiehle | June 28, 1949 |
| 2,475,074 | Bradley | July 5, 1949 |
| 2,489,156 | Rigrod | Nov. 22, 1949 |
| 2,496,535 | Hoglund | Feb. 7, 1950 |
| 2,562,958 | Smullin | Aug. 7, 1951 |
| 2,584,608 | Norton | Feb. 5, 1952 |
| 2,589,861 | Pound | Mar. 18, 1952 |
| 2,593,463 | Kinzer | Apr. 22, 1952 |
| 2,666,134 | Dicke | Jan. 12, 1954 |